(No Model.)

A. P. WINSLOW.
RAILWAY CAR STOVE.

No. 293,695. Patented Feb. 19, 1884.

2 Sheets—Sheet 1.

WITNESSES
H. Engel
Geo. W. King

Alonzo P. Winslow INVENTOR
By Leggett & Leggett
ATTORNEYS (No Model.) 2 Sheets—Sheet 2.
A. P. WINSLOW.
RAILWAY CAR STOVE.
No. 293,695. Patented Feb. 19, 1884.
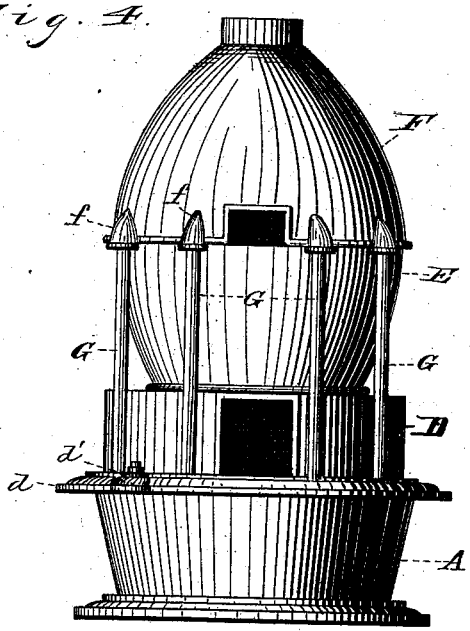
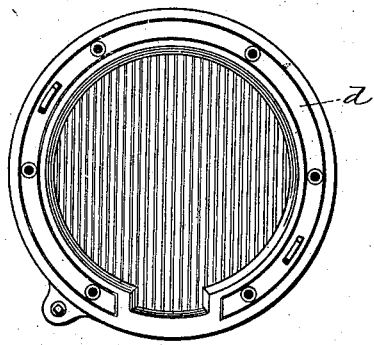
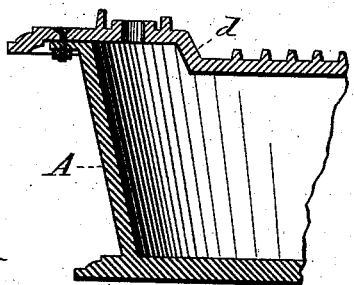
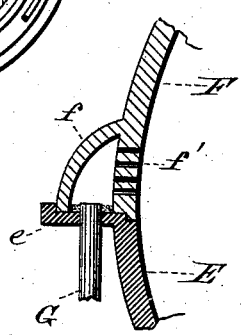
WITNESSES
INVENTOR
Alonzo P. Winslow
By Leggett & Leggett ATTORNEYS

UNITED STATES PATENT OFFICE.

ALONZO P. WINSLOW, OF CLEVELAND, OHIO.

RAILWAY-CAR STOVE.

SPECIFICATION forming part of Letters Patent No. 293,695, dated February 19, 1884.

Application filed June 25, 1883. (No model.)

*To all whom it may concern:*

Be it known that I, ALONZO P. WINSLOW, of Cleveland, in the county of Cuyahoga and State of Ohio, have invented certain new and useful Improvements in Railway-Car Stoves; and I do hereby declare the following to be a full, clear, and exact description of the invention, such as will enable others skilled in the art to which it pertains to make and use the same.

My invention relates to improvements in railroad-stoves; and it consists in certain features of construction and in combination of parts hereinafter described, and pointed out in the claims.

Figure 1:
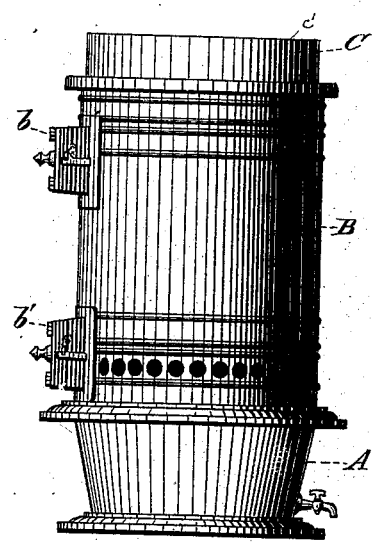
Figure 2:
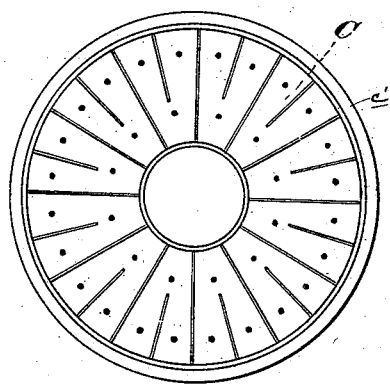
Figure 3:
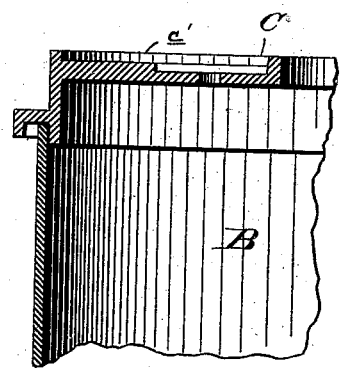

In the drawings, Figure 1 is a side elevation of my improved stove. Fig. 2 is a plan view of the top of the stove. Fig. 3 is a vertical section, in detail, illustrating the manner of joining the top and sides of the stove. Fig. 4 is a front elevation of the stove with the outside casing removed. Fig. 5 is a plan view of the bottom of the ash-pit. Figs. 6 and 7 are vertical sections in detail.

A represents what is known as a "water-base," and contains water that is designed to extinguish the fire in case the stove is overturned. As shown in Figs. 1 and 4, this base is made larger at the top than at the bottom, as in this shape water freezing in it will be less likely to break the casting.

B is the outer casing; b, the door leading into the fire-pot, and b' the door leading into the ash-pit. On a line with this last-mentioned door are shown holes in the outer casing, through which the air may enter around the fire-pot, and when heated may pass out through the perforations in the top plate, C, as shown in Fig. 2. This plate C is provided on its upper surface with the rim c and with ribs, the latter preferably set radially, as shown. This kind of top is convenient for heating vessels that may be placed thereon, the ribs keeping the vessels far enough removed from the disk so that the holes in the disk are not obstructed. In the center of this disk is seen a large orifice, through which the smoke-pipe passes to engage the inner part of the stove. Stoves with this kind of top are intended more especially for baggage, mail, express, emigrant, and caboose cars, where lunch-pails and the like may be warmed.

In Fig. 4, where the casing B is removed, is seen, as aforesaid, the water-base A, and next above the ash-box D, while d is at once the bottom of the ash-box and the cover for the water-base A. This part d may be shaped as shown in Fig. 6, and is provided in the central part, including all that is inside of the ash-box, with ribs, designed to prevent the ashes from being entirely removed. This layer of ashes is designed to protect this part from the heat above, so that the cover may not be cracked thereby, and also that the water below the cover may not be evaporated and wasted. Above the ash-box is the fire-pot E and the dome or cover of the fire-pot F. The dome F is provided with the bosses f, chambered as shown in Fig. 7, and with holes, as shown at f', leading from the chamber of the boss into the fire-box. The part E is provided with the lip e, (see Fig. 7,) that forms a seat for the boss f. These lips e also receive, respectively, the upper ends of the pipes G. The lower ends of these pipes are secured in the part d, thus forming an open communication from the water-base A to the inside of the fire-pot. If, therefore, the stove is tipped over, in whatever position it may fall the water from the base A will be discharged through some of these pipes into the fire-box and extinguish the fire.

The plug d' is for supplying water to the base A.

What I claim is—

1. In a water-base for a stove, the sides sloping upward and outward, and adapted to prevent the base from breakage when water is frozen therein, substantially as and for the purpose set forth.

2. In a stove provided with a water-base, the plate d, provided with a depression and ribs, as shown, and adapted to retain a layer of ashes to protect the plate from heat, substantially as shown and described.

3. The combination, with a stove made in two sections, the lower supporting the upper one, and the upper one provided with the bosses and perforations, of the water-base and pipes connecting the water-base and bosses of the upper section, substantially as set forth.

4. The combination, with the dome provided with the bosses $f$ and perforations $f'$, of the section E, provided with the portions $e$, which latter form seats for the bosses and receive the upper ends of the pipes G.

In testimony whereof I sign this specification, in the presence of two witnesses, this 18th day of June, 1883.

ALONZO P. WINSLOW.

Witnesses:
 ALBERT E. LYNCH,
 CHAS. H. DORER.